United States Patent [19]

Abe

[11] Patent Number: 4,835,356
[45] Date of Patent: May 30, 1989

[54] SPOT WELDING MACHINE
[75] Inventor: Noriyoshi Abe, Saitama, Japan
[73] Assignees: Yugen Kaisha Shinwa Kogyo, Saitama; Kyoshin Kogyo Co., Ltd., Tokyo, both of Japan
[21] Appl. No.: 168,933
[22] Filed: Mar. 16, 1988
[30] Foreign Application Priority Data
  Mar. 23, 1987 [JP] Japan .................................. 62-65802
[51] Int. Cl.⁴ .............................................. B23K 11/10
[52] U.S. Cl. .................................. 219/91.21; 219/56.1; 219/119; 219/120
[58] Field of Search .................. 219/56.1, 56.21, 56.22, 219/91.21, 119, 120
[56] References Cited
U.S. PATENT DOCUMENTS
  2,479,547  8/1949  Wersler et al. ...................... 219/119
FOREIGN PATENT DOCUMENTS
  52-14553  2/1977  Japan .

Primary Examiner—E. A. Goldberg
Assistant Examiner—Melissa C. Chiu
Attorney, Agent, or Firm—Frishauf, Holtz, Goodman & Woodward

[57] ABSTRACT

A spot welding machine comprising a first electrode and a second electrode opposed to the first electrode, whereby a workpiece, including, e.g., a conductor wire coated with a heat-resistant resin film and a terminal to be welded to the conductor wire, is subjected to electric-resistance welding in a manner such that the workpiece is held between the first and second electrodes. In the spot welding machine according to the present invention, a third electrode is interposed between the first electrode and the workpiece so that one distal-end side face of the third electrode abuts closely against a workpiece engaging end of the first electrode, and that the other distal-end side face of the third electrode is in contact with the workpiece. The proximal end of the first electrode is connected to a first terminal of AC power source means, and the respective proximal ends of the second and third electrodes are connected to a second terminal. The AC power source means supplies a current, used to heat the third electrode and remove the resin coating film by fusion, to a closed circuit having a route essentially consisting of the first terminal, first electrode, third electrode, and second terminal, during a predetermined period. After the removal of the coating film, the AC power source means supplies a current, used to weld the workpiece, to a closed circuit having a route essentially consisting of the first terminal, first electrode, third electrode, workpiece, second electrode, and second terminal.

11 Claims, 11 Drawing Sheets

SPOT WELDING MACHINE

BACKGROUND OF THE INVENTION

The present invention relates to a spot welding machine adapted to weld, for example, a covered conductor wire directly to a terminal or the like.

A conductor wire used in an electronic apparatus which is exposed to a high-temperature atmosphere is coated with heat-resistant synthetic resin, such as polyesterimide. The conductor wire of this type is connected to a terminal by means of a welded joint (spot welding) in order that the electrical connection can be maintained for a long period of time even in the high-temperature atmosphere. In welding the conductor wire to the terminal, it is necessary previously to remove an insulating coating film of synthetic resin on the wire. Conventionally, the coating film is removed mechanically or by chemical dissolution using a strongly alkaline solvent. The removal of the insulating coating film, however, requires much time and labor, thus entailing increase in manufacturing cost.

In order to solve this problem, a spot welding machine having a pair of upper electrodes and a lower electrode is conventionally disclosed in Japanese Patent Disclosure No. 52-14553. The respective lower-end side walls of the paired upper electrodes of this welding machine are closely in contact with each other. The upper electrodes are both connected to an AC power source, while the lower electrode and one of the upper electrodes are connected to a DC power source. In welding a conductor wire, coated with an insulating coating film to a terminal or the like by the use of this prior art spot welding machine, a workpiece is first clamped between the respective lower end faces of the upper electrodes and the upper end face of the lower electrode. While monitoring the electrode temperature in the vicinity of the lower ends of the upper electrodes, an AC current is supplied to the upper electrodes for a predetermined period of time. Thereupon, the coating film is heated to be melted, so that the conductor is exposed. Then, after the upper electrodes are fully cooled, a DC current is supplied between the upper and lower electrodes, thereby effecting electric-resistance spot welding of the exposed conductor and the terminal.

According to the prior art spot welding machine constructed in this manner, the heating of the electrodes for the separation of the coating film is controlled by only varing the conduction time while monitoring the temperature of the heated electrodes. The necessary heating time for the separation cannot, therefore, be adjusted according to the thickness of the coating film, for example. Thus, the coating film sometimes cannot be satisfactorily separated due to deterioration of the upper electrodes by electrolytic corrosion or variation of the film thickness. In such a case, the resulting welds may be defective or cannot enjoy good strength, so that it is hard to maintain uniform weld quality. Since the upper electrodes must be fully cooled before the DC welding current is supplied, moreover, the tack period for each welding cycle can be shortened only limitedly. It is therefore impossible to weld a number of workpieces in a short period of time. Thus, the conventional welding machine cannot enjoy high working efficiency.

OBJECTS AND SUMMARY OF THE INVENTION

The principal object of the present invention is to provide a spot welding machine, capable of securely welding a conductor wire, coated with a heat-resistant synthetic resin such as polyesterimide, to a terminal or the like with a required strength, without requiring any special pretreatment.

Another object of the present invention is to provide a spot welding machine, having a simple construction, and capable of welding a heat-resistant covered conductor wire directly to a terminal or the like, without requiring any special pretreatment.

Still another object of the present invention is to provide a spot welding machine of high working efficiency, capable of welding a heat-resistant covered conductor wire to a terminal or the like without requiring any special pretreatment, and ensuring uniform-quality welds.

According to the present invention, there is provided a spot welding machine, which includes a first electrode having a proximal end and an workpiece engaging end, and a second electrode opposed to the first electrode and having a proximal end and a distal end with a workpiece engaging face, whereby a workpiece is subjected to electric-resistance welding in a manner such that the workpiece is held between the first and second electrodes.

In the spot welding apparatus of the present invention, a third electrode is interposed between the first electrode and the workpiece so that one distal-end side face of the third electrode abuts closely against the workpiece engaging end of the first electrode, and the other distal-end side face is in contact with the workpiece. A first terminal of AC power source means and the proximal end of the first electrode are connected electrically with each other. A second terminal of the power source means and the respective proximal ends of the second and third electrodes are connected electrically with one another. Thus, the AC power source means supplies an AC current to the first and second terminals for a predetermined period.

During the predetermined period, the AC power source means supplies a current, used to heat the third electrode, to a closed circuit having a route essentially consisting of the first terminal, the first electrode, the third electrode, and the second terminal, and supplies a current, used to weld the workpiece as well as to heat the third electrode, to a closed circuit having a route essentially consisting of the first terminal, the first electrode, the third electrode, the workpiece, the second electrode, and the second terminal.

Preferably, the predetermined period, during which the AC power source means supplies the current, includes a first period during which a current of a first current value is supplied, and a second period during which a current of a second current value greater than the first current value is supplied, the first and second periods being substantially continuous with each other.

The spot welding machine of the present invention may suitably be applied to a workpiece which is composed of a first member having a synthetic resin coating film adapted to be removed by fusion using heat from the third electrode, and a second member adapted to be coupled to the first member by electric-resistance welding.

Preferably, moreover, the spot welding machine of the present invention further comprises a plurality of electrode holders for individually supporting at least the first and third electrodes, among the first, second, and third electrodes, the electrode holders each including support means and cooling means, the support means having one side wall and a hole bored in the one side wall, and adapted to support each corresponding electrode in a manner such that the proximal end of the electrode is fitted in and soldered to the hole, the cooling means having a cooling-water space, on which the one side wall faces and into which cooling water is introduced, the hole in the one side wall extending to the side of the cooling-water space so that the proximal end of the electrode projects into the space.

In the spot welding machine of the present invention, furthermore, the first electrode preferably has a distal end slanted at a predetermined angle, preferably ranging from 0° to 30°, to a plane vertical to the central axis of the first electrode and formed with an engaging groove with a substantially semicircular cross section, and one distal-end side face of the third electrode preferably has a curved surface with a substantially semicircular cross section, whose radius of curvature is smaller than that of the engaging groove of the first electrode, so that the one distal-end side face is fitted in the engaging groove. Also, there is a relation $0.93 r1 < r2 < 0.95 r1$, where r1 and r2 are the respective radii of curvature of the engaging groove of the first electrode and the one distal-end side face of the third electrode.

Preferably, moreover, the other distal-end side face of the third electrode is slanted along the loading or unloading direction of the workpiece, at a predetermined angle to the workpiece engaging face of the second electrode. Alternatively, the workpiece engaging face of the second electrode is slanted at a predetermined angle along the loading or unloading direction of the workpiece.

The above and other objects, features, and advantages of the invention will be more apparent from the ensuing detailed description taken in connection with the accompanying drawings.

DETAILED DESCRIPTION

Figure 1:
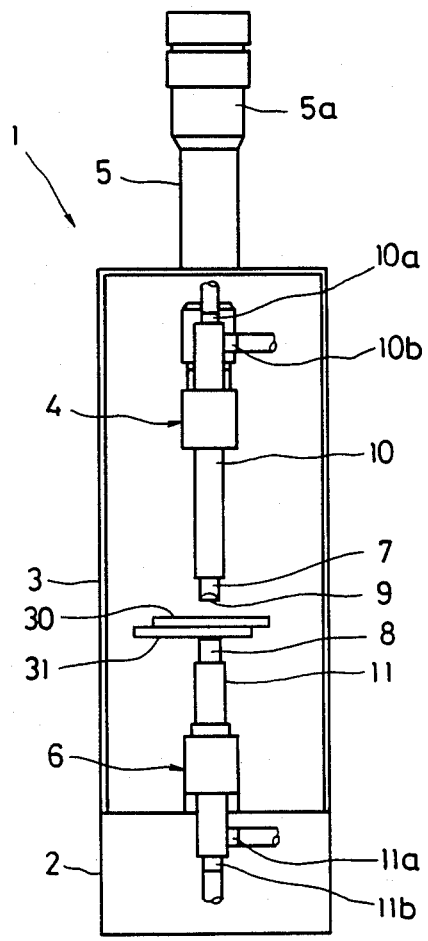
FIG. 1 is a front view showing a spot welding machine according to one embodiment of the present invention.
Figure 2:
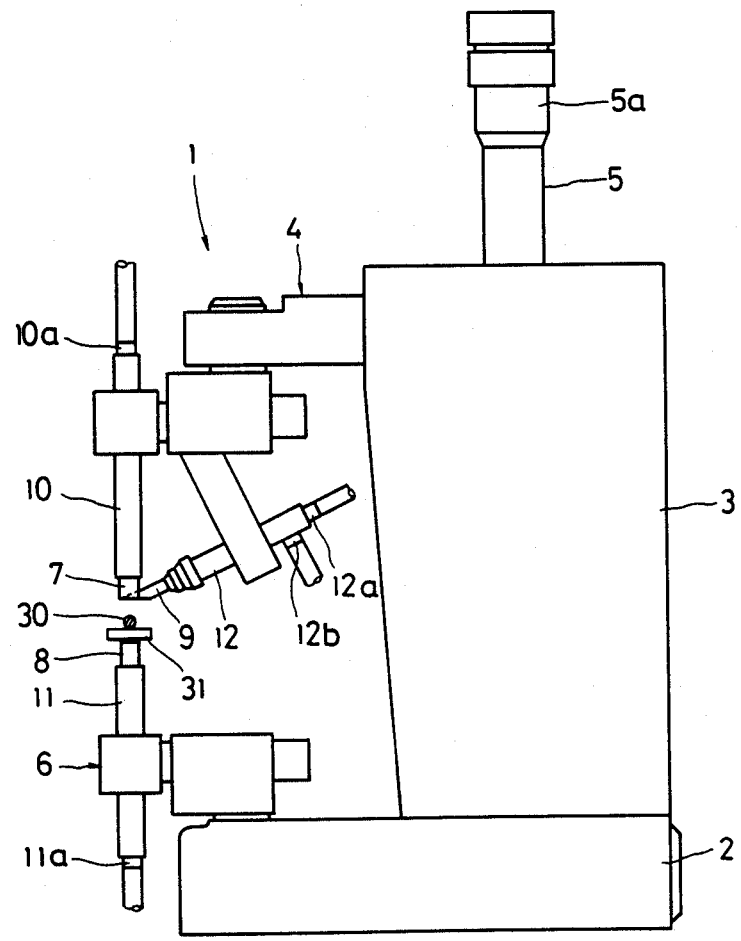
FIG. 2 is a side view of the spot welding machine shown in FIG. 1.

Referring first to the drawings of FIGS. 1 and 2, an outline of a spot welding machine according to the present invention will be described.

A body frame 3 is fixedly mounted on a base 2 of a spot welding machine 1, and an upper electrode supporting arm 4 is attached to the upper portion of the front face of the body frame 3 for vertical movement. The upper arm 4 supports electrode holders 10 and 12 mentioned later. The arm 4 is driven vertically by means of an actuator 5, such as an air cylinder. The actuator 5 is provided with an adjusting screw 5a for regulating the vertical stroke of the upper electrode supporting arm 4, i.e., those of the electrode holders 10 and 12 supporting first and third electrodes 7 and 9, respectively, which will be mentioned later. The pressure-welding force of the electrodes 7 and 9 can be adjusted to a desired value by controlling the adjusting screw 5a.

The electrode holder 10 includes a lower portion, which supports the proximal end of the first electrode 7 with the distal end thereof downward, and an upper portion supported by the upper electrode supporting arm 4. The electrode holder 10 has a water-cooled jacket structure, as mentioned later, such that the first electrode 7 is cooled by means of cooling water. The third electrode 9 includes a proximal end portion 9e (see FIG. 24) and a distal end portion 9a (see FIG. 6). The proximal end portion 9e is supported by the electrode holder 12 which is disposed behind the first electrode 7, as shown in FIG. 2. The distal end portion 9a, which extends diagonally downward from the proximal end portion 9e, abuts intimately against the distal end (workpiece engaging region) of the first electrode 7. The electrode holder 12 also has a water-cooled jacket structure, as mentioned later, such that the electrode 9 is cooled by means of the cooling water.

A lower electrode supporting arm 6 is fixedly mounted on that portion of the upper surface of the base 2 which faces the upper electrode supporting arm 4 from below. An electrode holder 11 supporting a second electrode (stationary electrode) 8 is supported by the lower arm 6. The second electrode 8 is fixed with its distal end face upward so that it faces the end face of the first electrode 7 and a slant end face (mentioned later) of the third electrode 9. The electrode holder 11 for the second electrode 8 is also composed of a water-cooled jacket so that the electrode 8 is water-cooled. The electrode holders 10, 11 and 12 are provided with cooling water supply ports 10a, 11a and 12a and cooling water discharge ports 10b, 11b and 12b, respectively. All these supply and discharge ports are connected to a cooling system (not shown), whereby the cooling water is supplied.

Figure 3:
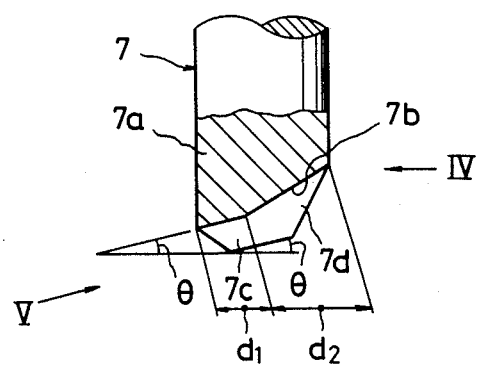
FIG. 3 is a cutaway enlarged view of the distal end of a first electrode 7 of the spot welding machine shown in FIG. 2.
Figure 4:
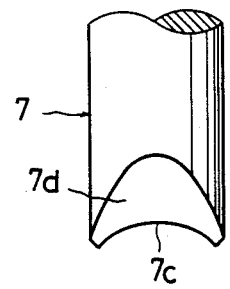
FIG. 4 is a side view taken in the direction of arrow IV of FIG. 3.
Figure 5:
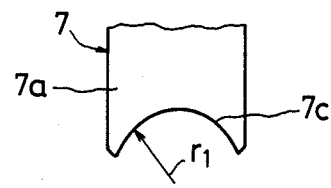
FIG. 5 is an end view taken in the direction of arrow V of FIG. 3.

As shown in FIGS. 3 to 5, the first electrode 7 is formed of a solid round rod, and the end face of its distal end 7a is cut aslant at a predetermined angle $\theta$ to a plane vertical to the axis of the electrode 7. An engaging groove 7b, having a substantially semicircular cross section with a radius r1, is cut in the center of the end face. As shown in FIG. 3, the engaging groove 7b includes two grooves 7c and 7d continuous with each other. The lengths of the bottom surfaces of the grooves 7c and 7d are designated as d1 and d2, respectively. The gradient of the bottom surface of the groove 7c is equal to the angle $\theta$, while the gradient of the bottom surface of the groove 7d is greater than the gradient $\theta$ of the bottom surface of the groove 7c. The groove 7c serves for the close engagement to the third electrode 9, while the groove 7d serves as an escape portion at which the first and third electrodes 7 and 9 are not in contact. The second electrode 8 is formed of a solid round rod having the same diameter as the first electrode 7.

Figure 6:
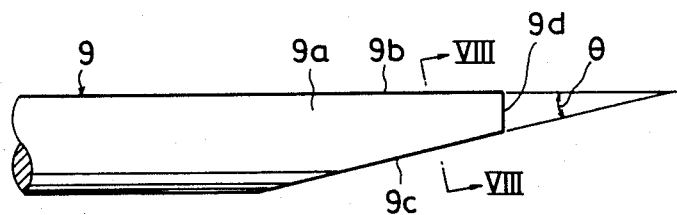
FIG. 6 is an enlarged view of the distal end of a third electrode 9 of the spot welding machine shown in FIG. 2.
Figure 7:
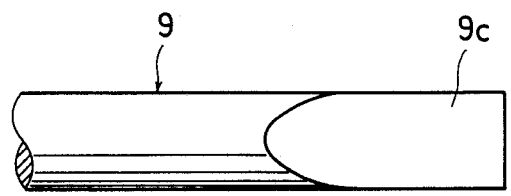
FIG. 7 is a bottom view of the third electrode 9 shown in FIG. 6.
Figure 8:
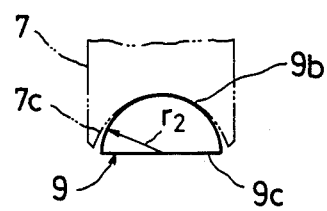
FIG. 8 is a sectional view taken along line VIII—VIII of FIG. 6.

As shown in FIGS. 6 to 8, the third electrode 9 is formed of a solid round rod having a diameter a little smaller than that of the first electrode 7. The distal end 9a is cut aslant by a plane which contains the diameter of an end face 9d and is inclined at the angle $\theta$ to the axis of the electrode 9. One side face 9b of the distal end 9a is a curved surface whose radius of curvature is r2 ($<$r1), and the other side face 9c of the distal end is flat. The curved side face 9b is engagedly fitted in the groove 7c of the engaging groove 7b of the first electrode 7, while the other side face 9c is adapted to engage a workpiece.

Thus, the curved face 9b of the distal end 9a of the third electrode 9 is fitted in the groove 7c of the first electrode 7, and the difference $\Delta r$ ($=r1-r2$) between the respective radii r1 and r2 of the inner curved surface of the groove 7c and the curved face 9b is adjusted to a value a little greater than the regular fit tolerance. For example, the radius r2 of the curved face 9b of the third electrode 9 is preferably set to a value within a range given by $0.93r1 < r2 < 0.95r1$, compared with the radius r1 of the groove 7c of the first electrode 7.

Figure 9:
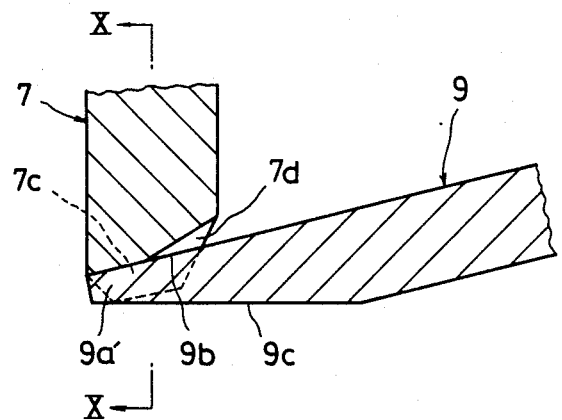
FIG. 9 is an enlarged sectional view showing a junction between the respective distal ends of the first and third electrodes 7 and 9.
Figure 10:
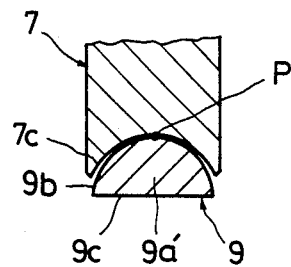
FIG. 10 is a sectional view taken along line X—X of FIG. 9.
Figure 11:
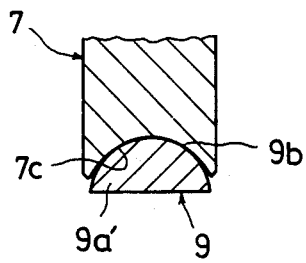
FIG. 11 is a sectional view showing the state of intimate contact between the electrodes shown in FIG. 10.

The upper limit value of the radius r2 is set to a value such that it not only absorbs the machining and mounting errors of the first and third electrodes 7 and 9 when the distal end 9a of the electrode 9 is fitted in the groove 7c of the electrode 7, as shown in FIGS. 9 to 11, but also allows the curved inner surface of the groove 7c and the curved side faces 9b of the electrode 9 to be securely in contact with each other at their center P. The lower limit value of the radius r2 is adjusted to a minimum value such that the substantially whole regions of the two abutting curved surfaces can satisfactorily engage to each other by electrolytic corrosion, as shown in FIG. 11, when current flows through the abutting electrodes. Since the inner surface of the groove 7c and the side face 9b are curved, they can enjoy a wider engagement area than when they are flat.

Thus, the curved face 9b of the third electrode 9 can be prevented from being located one-sided in the groove 7c of the first electrode 7 in a manner such that only part of the curved face 9b engages the inner surface of the groove 7c. Since the radius r2 of the curved face 9b is bound to be smaller than the radius r1 of the groove 7c, moreover, such an awkward situation can be avoided that the central portion of the face 9b is not in contact with the inner surface of the groove 7c although the face 9b engages either edge of the groove 7c.

Although the groove 7c of the first electrode 7 and the distal end 9a of the third electrode 9 are connected electrically by engagement, the groove 7d of the electrode 7 is isolated from the distal end 9a of the electrode 9. Accordingly, a welding current, flowing from the electrode 7 to the electrode 9, passes intensively through the groove 7c and the region engaging thereto. Thus, heat can be concentrated in a contact region 9a' of the distal end 9a of the electrode 9.

The first electrode 7 is located vertically with its distal end face downward, and the third electrode 9 is held against the electrode 7 so as to decline to the groove 7c from behind and above the same. In this state, the distal end 9a is fitted intimately in the groove 7c, and the flat face 9c, which is expected to engage the workpiece, extends horizontally. Thus, the third electrode 9 is positioned at the aforesaid predetermined angle $\theta$ to a horizontal plane. The angle $\theta$ is set within a range of 8° to 30°, and preferably, is adjusted to 13° or thereabout. By tilting the contact portions of the first and third electrodes 7 and 9 in this manner, the welding current can be stabilized, and cracks can be prevented from being caused by electrolytic corrosion. Accordingly, these electrodes are improved in durability.

Figure 12:
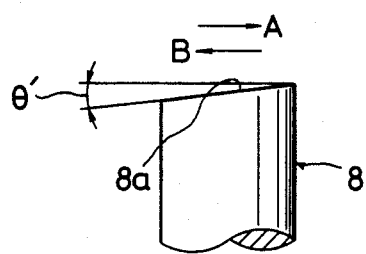
FIG. 12 is an enlarged view of the distal end of second electrode 8 of the spot welding machine shown in FIG. 1.

As shown in FIG. 12, moreover, the second electrode 8 is formed so that its end face 8a, which is opposed to the third electrode 9, is slanted at a predetermined angle $\theta'$ to the other side face 9c of the distal end of the electrode 9. The end face 8a is slanted with respect to a loading direction A or an unloading direction B of the workpiece. Preferably, the slant end face 8a is adjusted so that its upper end is in alignment with the distal end side of the workpiece. Usually, the gradient $\theta'$ of the end face 8a fo the electrode 8 ranges from about 1° to 3°. If the workpiece is a wire member, however, the gradient θ' should preferably be adjusted to the diameter of the wire member.

The first and third electrodes 7 and 9 have an electric resistance higher than that of the second electrode 8. For example, molybdenum, tungsten, etc. may be suitably used as the materials of the first and third electrodes 7 and 9. Available materials for the second electrode 8, moreover, include copper containing 35% tungsten by weight, tungsten containing silver, tungsten containing zirconium, etc., for example. Besides these materials, tungsten alloys with the same electrical characteristics may be used for the first to third electrodes 7 to 9.

Figure 13:
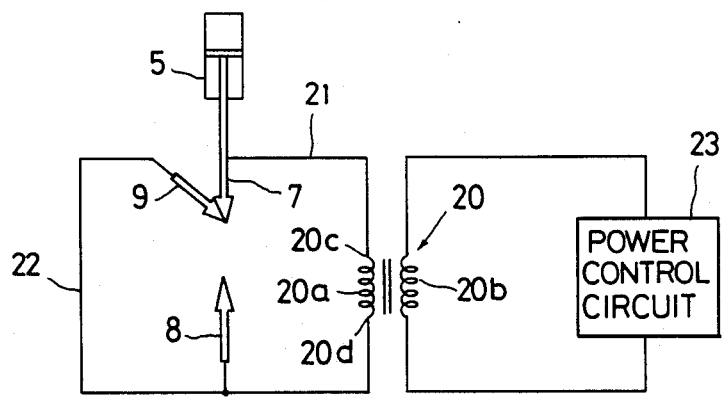
FIG. 13 is a circuit diagram of the spot welding machine shown in FIG. 1.

As shown in FIG. 13, the proximal end side of the first electrode 7 is connected to one end 20c of a secondary coil 20a of a welding transformer 20 by means of a conductor wire 21. The proximal end side of the third electrode 9, along with that of the second electrode 8, is connected to the other end 20d of the secondary coil 20a by means of a conductor wire 22. A primary coil 20b of the welding transformer 20 is connected to a power control circuit 23.

Figure 14:
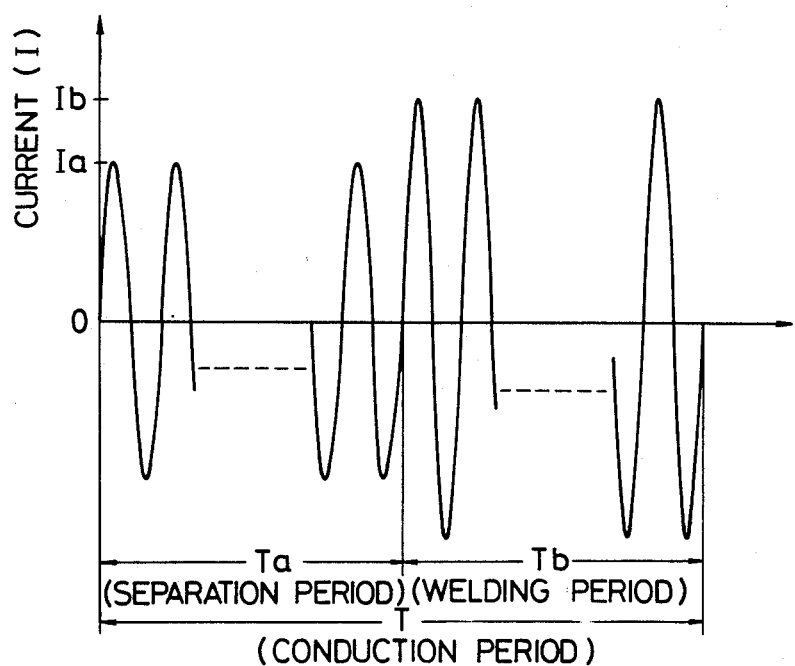
FIG. 14 is a graph for illustrating a conduction method for the spot welding machine of the present invention, in terms of the time-based transition of the waveform of current supplied.

The power control circuit 23 supplies the primary coil 20b of the transformer 20 with, e.g., commercial AC power of 50 Hz, and causes the secondary coil 20a to be supplied with a welding AC current of 50 Hz for a predetermined period T. Thus, separation of a coating film from the workpiece by fusion and welding are effected continuously. The power control circuit 23 is constructed so that the workpiece conduction period T is divided into two periods; a first-half period (hereinafter referred to as separation period) Ta, required for the separation of the coating film by fusion, and a second-half period (hereinafter referred to as welding period) Tb, required for actual welding, as shown in FIG. 14, and that a current (hereinafter referred to as separation current) Ia, required for the separation of the coating film, and a current (hereinafter referred to as welding current) Ib, required for the actual welding, can be caused to flow through the secondary coil 20a of the transformer 20 during the separation period Ta and the welding period Tb, respectively.

Figure 15:
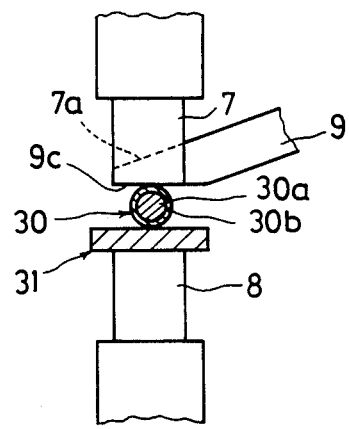
FIG. 15 is an enlarged sectional side view of the principal part of the spot welding machine of FIG. 1, showing a state such that workpiece is held by means of the first to third electrodes.
Figure 16:
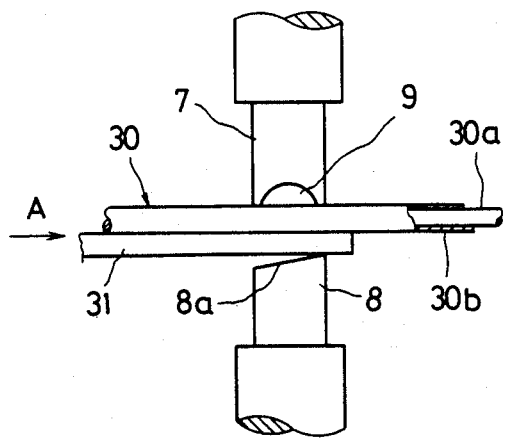
FIG. 16 is an enlarged front view, partially in section, of the principal part of the spot welding machine of FIG. 1, showing the workpiece is held by means of the first to third electrodes.

A sequence of operations and the functions of the spot welding machine 1, constructed in this manner, will now be described. In this case, the workpiece used includes, for example, a conductor wire 30, composed of a copper core 30a with a core diameter of 0.34φ coated with polyesterimide 30b, and an electrically conductive terminal member 31 (see FIG. 15), which are to be welded together.

First, the cooling water is fed to the respective water-cooled jackets of the electrode holders 10 to 12. Then, as shown in FIGS. 1, 2, 15 and 16, the conductor wire 30 is put on a desired portion of the top surface of the terminal member 31, and the resulting workpiece is fed in the direction of arrow A (see FIG. 16) to be placed on the second electrode 8. Subsequently, the actuator 5 is worked to lower the first and third electrodes 7 and 9, thereby pressing the flat face 9c of the electrode 9 against the workpiece with a required force of pressure, so that the workpiece is held between the second electrode 8 and the combination of the first and third electrodes 7 and 9.

Then, the power control circuit 23 is switched on to energize the secondary coil 20a of the transformer 20. The control circuit 23 causes the separation current Ia (see FIG. 14) to flow through the secondary coil 20a during the separation period Ta, which starts at the beginning of the current supply. At the start of the supply of the separation current Ia, the conductor wire 30 is covered with the coating film 30b, and therefore, is insulated. Accordingly, the current cannot flow directly between the first and second electrodes 7 and 8, and is allowed to flow through a closed circuit which is composed of the conductor wire 21, first and third electrodes 7 and 9, conductor wire 22, and secondary coil 20a. Since the electrodes 7 and 9 has a higher electric resistance than the electrode 8, and are connected only at their distal end portions abutting against each other, so the contact region 9a' (see FIG. 9), which has a relatively high resistance, is quickly heated to high temperature as the current is supplied.

As the first and third electrodes 7 and 9 are heated in this manner, the coating film 30b on the conductor wire 30 is melted and separated. Thereupon, the copper core 30a is exposed to allow the electrode 7 and the terminal member 31 to conduct during the latter half of the separation period Ta. Thus, the coating film 30b is separated satisfactorily from the core 30a. As a result of such conduction, the welding current starts to flow between the first and second electrodes 7 and 8 via the workpiece. During the welding period Tb, following the separation period Ta, the secondary coil 20a is supplied with the welding current Ib which is greater than the separation current Ia.

Part of the welding current Ib is by-passed through the course from the first electrode 7 to the third electrodes 9. Also, the current Ib is reduced as the resistance increases due to the heating, electrolytic corrosion, oxidation, etc. of the electrodes. In anticipation of such a reduction, however, the welding current Ib is set to the aforesaid relatively great value. Accordingly, the power control circuit 23 can provide a welding current flow great enough for the welding of the workpiece during the weld period Tb. Thus, during the welding period Tb, the copper core 30a and the terminal member 31 are welded together.

Figure 17:
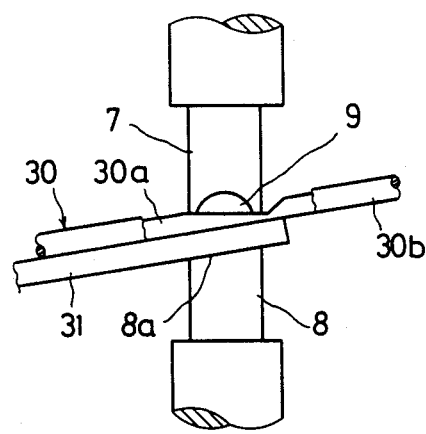
FIG. 17 is an enlarged front view of the principal part, showing the relationships between the electrodes and the workpiece at the time of welding the workpiece shown in FIGS. 15 and 16.
Figure 18:
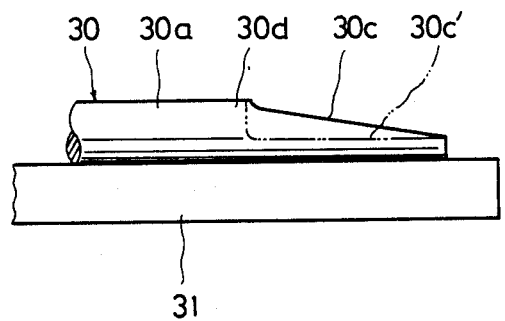
FIG. 18 is a side view of a weld portion after the welding process shown in FIG. 17.
Figure 19:
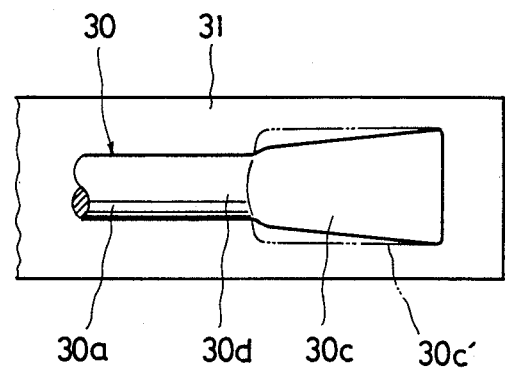
FIG. 19 is a plan view of the weld portion after the welding process shown in FIG. 17.

Since the end face 8a of the second electrode 8 is slanted, in the meantime, the terminal member 31 and the copper core 30a are inclined along the end face 8a by the force of pressure from the first and third electrodes 7 and 9 at the time of welding, as shown in FIG. 17. Accordingly, a contact surface 30c of the copper core 30a in contact with the third electrode 9 is tapered from the proximal side toward the distal side, as shown in FIGS. 17 to 19. Thus, a joint portion 30d of the copper core 30a, connecting with the proximal end of a weld portion, in particular, can be prevented from being lowered in strength. If the end face 8a of the second electrode 8 is not slanted, that portion of the core 30a in contact with the third electrode 9, i.e., the weld portion, is flattened, as indicated b a two-dot chain line 30c' in FIGS. 18 and 19. As a result, the joint portion 30d connecting with the proximal end of the weld portion is lowered in strength.

In the embodiment described above, the end face 8a of the second electrode 8 is slanted at the angle θ' to a horizontal plane, and the face 9c of the third electrode 9 is horizontal. In contrast with this, however, the end face 8a of the second electrode 8 may be formed horizontally. In this case, the face 9c of the third electrode 9 is slanted with respect to the loading direction or the unloading direction of the workpiece.

As described above, the heating of the first and third electrodes 7 and 9, the separation of the coating film 30b by fusion, and the welding of the copper core 30a and the terminal member 31 can be finished in a very short time. The weld time varies depending on the dimensions of the workpiece to be welded, e.g., the core diameter of the conductor wire 30, the thickness of the terminal member 31, etc. If the weld time is too short, the strength of the welded joint is not satisfactory. If the weld time is too long, on the other hand, the copper core 30a may possibly be broken from pressure or undesirably annealed to become brittle. Thus, the weld time should be suitably adjusted in consideration of these circumstances.

When using a wire member composed of the 0.34φ copper core coated with polyesterimide for use as the workpiece, the separation period Ta and the welding period Tb are set to approximately 0.3 sec (about 15 cycles) each, and the separation current Ia and the welding current Ib are adjusted to about 600 A and 800 A, respectively. Thus, the welding current Ib is greater than the separation current Ia (Ib >Ia). It is to be understood that the periods Ta and Tb and the currents Ia and Ib are adjusted to their respective optimum values depending on the core diameter, coating film thickness, etc. of the wire member. Naturally, also in this case, the welding current Ib is greater than the separation current Ia.

The separation period Ta and the welding period Tb may be made continuous with each other so that the separation current Ia and the welding current Ib are supplied continuously. Alternatively, a very short cooling period (downtime), as short as one cycle or thereabout, may be interposed between the periods Ta and Tb.

Figure 20:
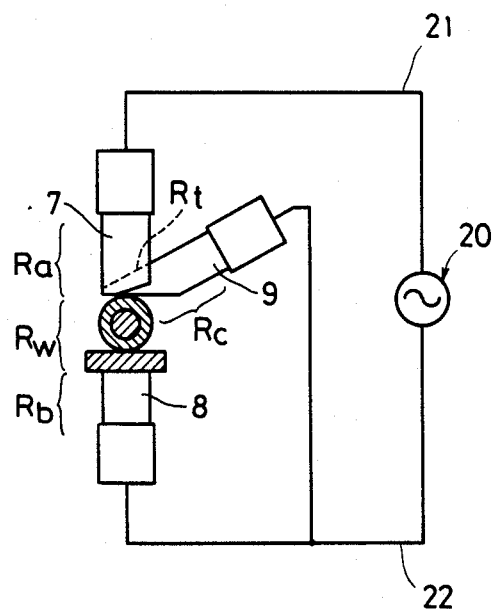
FIG. 20 is a block diagram schematically showing a method of electrically connecting the electrodes and a welding transformer of the spot welding machine of the present invention.
Figure 21:
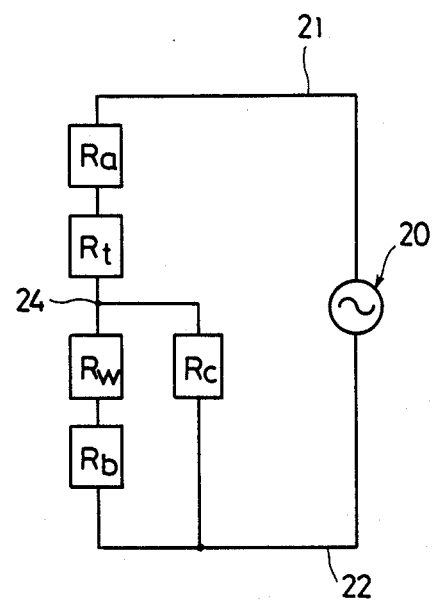
FIG. 21 is an equivalent circuit diagram showing a simpler version of the block diagram of FIG. 20.

In the spot welding machine according to the present invention, the electrodes 7 and 9 and the welding transformer 20 should be connected in the manner shown in FIG. 13. The reason for this will now be described in detail. Referring first to FIGS. 20 and 21, an equivalent circuit obtained with use of the method of connection of the invention will be explained. Let it be supposed that the internal resistances of the first, second, and third electrodes 7, 8 and 9 are Ra, Rb and Rc, respectively, the contact resistance between the first and third electrodes 7 and 9 is Rt, and the internal resistance of that portion of the workpiece between the top end face of the second electrode 8 and the other side face of the distal end of the third electrode 9, including the contact resistances between the workpiece and the electrodes, is Rw. The circuit diagram of FIG. 20 can be replaced by the equivalent circuit diagram of FIG. 21 as its simpler version. In FIG. 21, resistors Ra, Rt, Rw and Rb are connected in series in the order named. These resistors, the conductor wire 22, the welding transformer 20, and the conductor wire 21 constitute a closed circuit. A resistor Rc of the third electrode 9 is disposed on a line which diverges, at one end thereof, from a node 24 between the resistors Rt and Rw and is connected in parallel with the resistors Rw and Rb.

Figure 22:
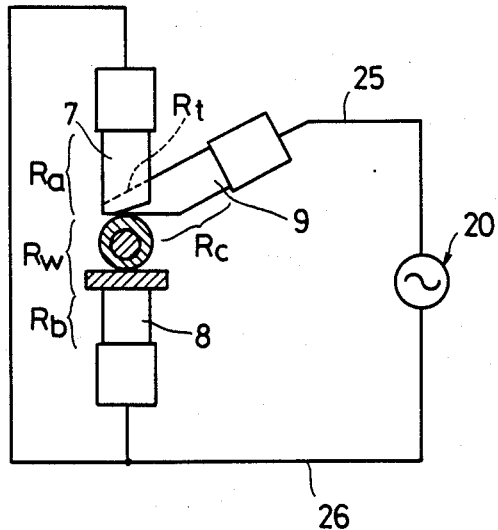
FIG. 22 is a schematic block diagram showing a comparable method of electrically connecting the electrodes and the welding transformer.
Figure 23:
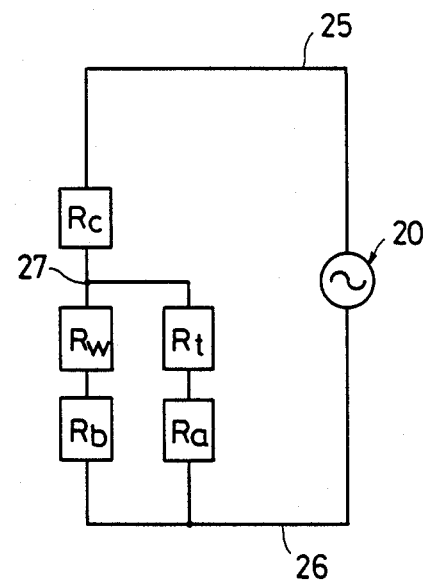
FIG. 23 is an equivalent circuit diagram showing a simpler version of the block diagram of FIG. 22.

As compared with the method of connection according to the present invention, a method for comparison may be proposed such that the proximal side of the third electrode 9 is connected to one end of the secondary coil of the welding transformer 20 by means of a conductor wire 25, and that the proximal side of the first electrode 7, along with that of the second electrode 8, is connected to the other end of the secondary coil by means of a conductor wire 26, as shown in FIG. 22. A connection circuit according to this alternative method can be simply represented by an equivalent circuit shown in FIG. 23. In FIG. 23, the resistors Rc, Rw and Rb are connected in series in the order named. These resistors, the conductor wire 26, the welding transformer 20, and the conductor wire 25 constitute a closed circuit. The resistors Rt and Ra are arranged successively on a line which diverges from a node 27 between the resistors Rc and Rw and is connected in parallel with the resistors Rw and Rb.

The resistances Ra, Rb and Rc of the electrodes 7, 8 and 9 has a value of about 0.1 mΩ, as measured at room temperature, and the contact resistor Rt has a value of about 10 mΩ. The resistance Rw of the workpiece changes its value depending on the states of separation of the coating film and welding.

In the case of the spot welding machine of the present invention, all the separation current flows through a closed circuit composed of the welding transformer 20, conductor wire 21, resistors Ra and Rt, node 24, resistor Rc, and conductor wire 22, in the initial stage of the separation period Ta, that is, during the period when the coating film is not melted yet and there is no conduction between the third and second electrodes 9 and 8. Subsequently, when part of the coating film melts, thereby allowing conduction between the third and second electrodes 9 and 8 to start, the current partially flows through the resistors Rw and Rb. Also during the welding period Tb, thereafter, part of the welding current flows through the resistors Rw and Rb, and the remaining part flows through the resistor Rc. According to the method of connection of the spot welding machine of the present invention, all the current supplied flows through the contact resistor Rt all during the conduction period T, which combines the separation period and the welding period. This indicates that heat for the coating film separation can be maintained throughout the conduction period. If the coating film is not fully separated in the separation period Ta, therefore, the separation can be completed in the succeeding welding period Tb. This leads to the following advantages. Since the spot welding machine of the present invention uses an AC power source, it is necessary only that the conduction period T and the current value be adjusted to proper values. Thus, the processes of film separation and welding need not be strictly separated when they are controlled by means of the power control circuit. More specifically, the welding current starts to flow during the latter half of the film separation process, and the third electrode 9 continues to be heated even in the welding process. If the separation of the coating film is not finished yet at the end of the separation period Ta, therefore, heat is supplied for the separation during the first half of the succeeding welding period. Thus, even though the conduction time and the current value required for the processes of separation and welding somewhat change, due to variation in thickness of the conductor wires, deterioration of the electrodes, etc., the film separation and the welding can be accomplished satisfactorily. As a result, the quality of weld is subject to less variation, and a desired weld strength can be obtained securely.

According to the method for comparison, on the other hand, when part of the coating film is separated to allow the welding current to start flowing, the current flowing through the resistor Rt is reduced, so that the amount of heat produced for film separation becomes too small for satisfactory separation. If the welding process is started after the separation is completed, welding with use of the connection method for comparison can be effected with less current, by a margin corresponding to the absence of a current flow through the resistor Rt, than by the use of the connection method according to the present invention. Since the welding current flows before the coating film is not fully separated yet, however, the separation is not complete, so that the welding cannot be performed satisfactorily. Thus, the product quality, such as the weld strength of each workpiece, fluctuates due to variations of external factors, thereby lowering the yield.

Figure 26:
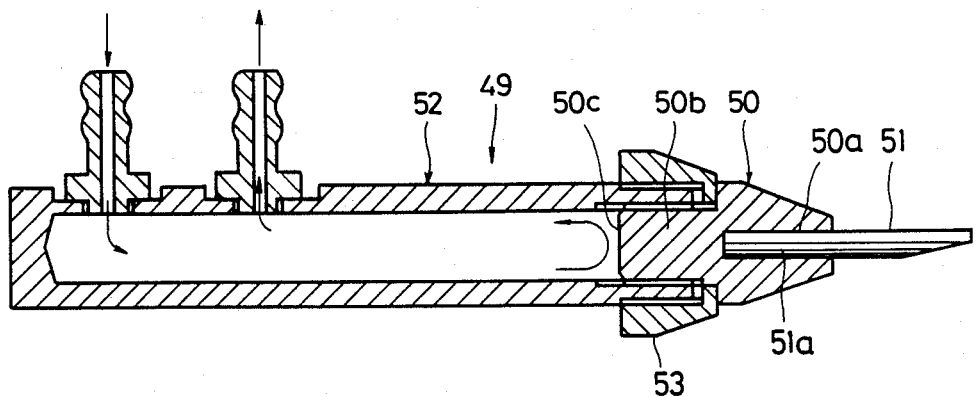
FIG. 26 is a sectional view of an electrode holder for a prior art spot welding machine.

In the spot welding machine constructed in this manner, if the third electrode 9 is heated unduly, the regular welding current may sometimes fail to flow during the welding process after the removal of the plastic coating film. Therefore, the third electrode 9 should be specially cooled. This is done, for example, by a prior art water-cooling method, as shown in FIG. 26. In FIG. 26, a prior art water-cooled electrode holder 49 includes a plug 50, a water-cooled jacket 52, and a fixing nut 53. The electrode 51 is supported by the plug 50 in a manner such that its proximal end 51a is fitted in a hole 50a bored in the distal end of the plug 50. A proximal end 50b of the plug 50 is screwed in the distal end of the water-cooled jacket 52 in a liquid-tight manner, and is fixed by means of the fixing nut 53. The cooling water is circulated through the jacket 52, as indicated by the arrow of FIG. 26, whereby an proximal end face 50c of the plug 50 is cooled so that the electrode 51 is cooled.

In the prior art water-cooled electrode holder 49 described above, however, the plug 50 is first cooled by means of the cooling water, and the electrode 51 is then cooled. In other words, the electrode 51 is cooled indirectly, that is, through the medium of the plug 50, so that the cooling efficiency for the electrode 51 is low. Thus, the electrode 51 may possibly be overheated if the intervals between welding cycles are too short. It is necessary, therefore, to perform welding at intervals of 5 to 7 seconds or thereabout. This would result in lowering of the working efficiency of the spot welding machine.

The heating condition of the electrode 51 may, for example, be monitored by means of a thermocouple embedded in the plug 50, or by detecting infrared rays. Since the electrode 51 is fixed integrally to the plug 50, however, the plug 50 must be also replaced when the electrode 51 is to be replaced with a new one. Thus, the use of the thermocouple is not economical. In any case, a special device is required for monitoring the heating condition, so that the machine is expensive.

Figure 24:
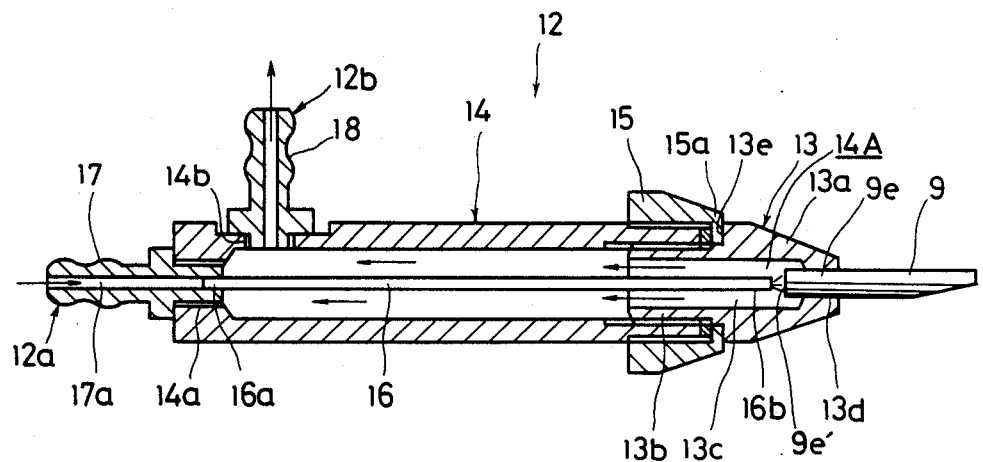
FIG. 24 is a sectional view showing an example of an electrode holder for the spot welding machine according to the present invention.

FIG. 24 shows the electrode holder 12 used in the spot welding machine according to the present invention. The electrode holder 12 is composed, for example, of a plug 13 for supporting the third electrode 9, a water-cooled jacket 14 for supporting the plug 13, a fixing nut 15 for fixing the plug 13 to the jacket 14, and a pipe 16 constituting a cooling water passage. The plug 13 has a distal end 13a shaped like a truncated cone and a cylindrical proximal end 13b. A stepped portion 13e is formed between the ends 13a and 13b, and the outer peripheral surface of the proximal end 13b is threaded. A major hole 13c and a minor hole 13d are bored coaxially through the plug 13, the former being larger in diameter than the latter. The major hole 13c opens to the central portion of the end face of the proximal end 13b, while the minor hole 13d opens to the central portion of the distal end face of the plug 13. The plug 13, shaped like this, is formed integrally from an electrically conductive material.

A rear end 9e of the third electrode 9 is fitted in the minor hole 13d, which opens to the distal end face of the plug 13, in a manner such that its extreme end portion 9e' projects into the major hole 13c for a predetermined length. The electrode 9 is immovably fixed to the plug 13 to be connected electrically thereto, by soldering.

The water-cooled jacket 14 has the shape of a bottomed hollow cylinder. The outer and inner peripheral surfaces of the open end portion of the jacket 14 are both threaded. Tapped holes 14a and 14b are bored through the closed end face of the jacket 14 and a specific portion of the side wall in the vicinity thereof, respectively. The proximal end 13b of the plug 13 is screwed in the open end of the jacket 14 in a liquid-tight manner. The fixing nut 15 is interposed between the plug 13 and the jacket 14. More specifically, the nut 15 is screwed on the open end of the jacket 14 so that its distal end 15a is sandwiched between the open end face of the jacket 14 and the stepped portion 13e of the plug 13.

After the proximal end 13b of the plug 13 is screwed into the water-cooled jacket 14, the distal end 15a of the fixing nut 15 is pressed against the stepped portion 13e of the plug 13, thereby forcing the plug 13 outward from the open end of the jacket 14. By doing this, the jacket 14 and the plug 13 are fixed firmly to each other. When the plug 13 is fixedly secured in the jacket 14, the third electrode 9 is located in alignment with the axis of the jacket 14, and the end face 9e' of the proximal end 9e is situated inside the jacket 14.

Connectors 17 and 18 are screwed in the tapped holes 14a and 14b of the water-cooled jacket 14, respectively. The cooling water is introduced into and discharged from the jacket 14 through the connectors 17 and 18, respectively. Thus, the connectors 17 and 18 constitute a cooling-water supply port 12a and a cooling-water discharge port 12b, respectively. One end 16a of the slender pipe 16 is fitted in a hole 17a, which extends along the axis of the one connector 17. On the other end side, the pipe 16 loosely penetrates the jacket 14 so as to extend substantially along the axis of the jacket 14 into the major hole 13c. The other end 16b faces the end face 9e' of the third electrode 9 at a distance of several millimeters, preferably 1 to 3 mm or thereabout. The pipe 16 serves as a passage through which the cooling water flows into a cooling-water space 14A on which the end face 9e' of the third electrode 9 faces. The connectors 17 and 18 are connecetd to a cooling system (not shown) by means of connecting pipes (not shown). The diameter of the pipe 16 is set in accordance with the pressure of the cooling water used.

The low-temperature cooling water delivered from the cooling system flows into the pipe 16 through the connector 17 of the water-cooled jacket 14, and is then sprayed through the open end of the pipe 16 onto the end face 9e' of the electrode 9, thereby cooling the electrode 9. Thus, the electrode 9 is cooled directly by the cooling water, so that the cooling efficiency is improved. After cooling the electrode 9, the cooling water flows in the direction indicated by the arrows, inside the major hole 13c, thereby entering the inside space of the water-cooled jacket 14. Meanwhile, the plug 13 is cooled by the cooling water flowing in the major hole 13c. Since the hole 13c is bored along the axis of the plug 13, the whole plug can be cooled with high efficiency.

The proximal end of the electrode 9 is fitted in the minor hole 13d of the plug 13, so that the electrode 9 is cooled also by the plug 13. In consequence, the electrode 9 can be cooled more efficiently. After cooling the plug 13, the cooling water inside the water-cooled jacket 14 flows out therefrom through the connector 18, and returns to the cooling system. Thus, the electrode 9 can be cooled very satisfactorily, and can therefore be restrained from overheating. In this connection, the weld time interval of the spot welding machine of the present invention can be reduced to about 1 to 3 seconds, which is much shorter than in the case of the prior art machine. Thus, the working efficiency of the welding machine is improved.

The second electrode 8, which is less susceptible to heat than the first and third electrodes 7 and 9, may be supported by means of the electrode holder 49 based on the conventional cooling system, as shown in FIG. 26, instead of using the electrode holder 12 shown in FIG. 24.

Figure 25:
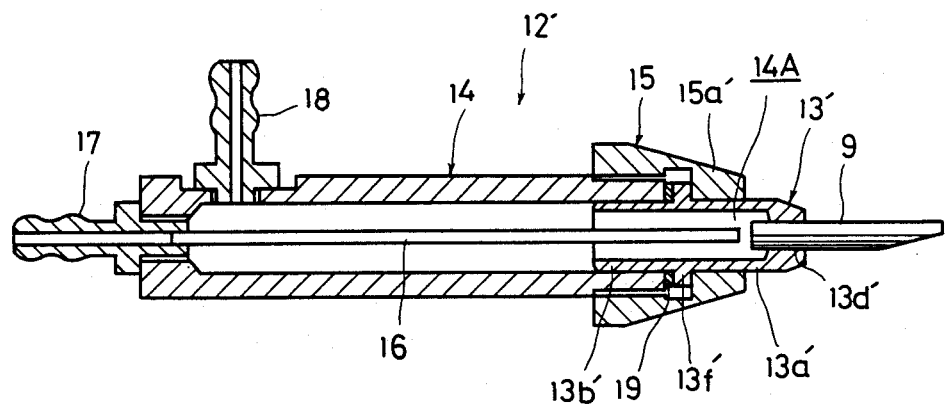
FIG. 25 is a sectional view showing a modification of the electrode holder for the spot welding machine shown in FIG. 24.

An electrode holder 12' for a spot welding machine shown in FIG. 25 is a modification of the electrode holder 12 of FIG. 24. As shown in FIG. 25, distal and proximal ends 13a' and 13b' of a plug 13' have the same outside diameter, and a land 13f is formed at the junction of the two ends. The proximal end 13b' is simply fitted in the open end of the water-cooled jacket 14 without any threads on the end 13b' or the open end of the jacket 14. A distal end 15a' of a fixing nut 15' is made longer enough to be fitted on the distal end 13a' of the plug 13°. An O-ring 19 is interposed between the land 13f of the plug 13' and the open end of the jacket 14. If the fixing nut 15' is tightened, in this arrangement, the land 13f of the plug 13' is pressed liquid-tight against the open end of the jacket 14 by means of the distal end 15a' of the nut 15'. Thus, the water-cooled jacket 14 and the plug 13° can be easily coupled in liquid-tight relation, the plug 13' can be attached or detached with ease for the replacement of the electrode 9.

What is claimed is:

1. A spot welding machine including a first electrode having a proximal end and a workpiece engaging end, and a second electrode opposed to said first electrode and having a proximal end and a distal end with a workpiece engaging face, whereby a workpiece is subjected to electric-resistance welding in a manner such that said workpiece is held between said first and second electrodes, comprising:
   a third electrode interposed between said first electrode and said workpiece, and having a proximal end, one distal-end side face abutting closely against said workpiece engaging end of said first electrode, and another distal-end side face in contact with said workpiece; and
   AC power source means having a first terminal connected electrically with said proximal end of said first electrode, and a second terminal connected electrically with said respective proximal ends of said second and third electrodes, so that an AC current is supplied to said first and second terminals for a predetermined period,
   said AC power source means being adapted, during said predetermined period, to supply a current, used to heat said third electrode, to a closed circuit having a route comprising said first terminal, said first electrode, said third electrode, and said second terminal, and to supply a current, used to weld said workpiece as well as to heat said third electrode, to a closed circuit having a route essentially consisting of said first terminal, said first electrode, said third electrode, said workpiece, said second electrode, and said second terminal.

2. The spot welding machine according to claim 1, wherein said predetermined period includes a first period during which a current of a first current value is supplied, and a second period during which a current of a second current value greater than said first current value is supplied, said first and second periods being substantially continuous with each other.

3. The spot welding machine according to claim 1, wherein said first and third electrodes has an electric resistance greater than that of said second electrode.

4. The spot welding machine according to claim 1, wherein said workpiece comprises a first member having a synthetic resin coating film adapted to be removed by fusion using heat from said third electrode, and a second member adapted to be coupled to said first member by electric-resistance welding.

5. The spot welding machine according to claim 1, which further comprises a plurality of electrode holders for individually supporting at least said first and third electrodes, among said first, second, and third electrodes, each said electrode holder including support means and cooling means, said support means having one side wall and a hole bored in said one side wall, and adapted to support each corresponding electrode in a manner such that the proximal end of said electrode is fitted in and soldered to said hole, said cooling means having a cooling-water space, on which said one side wall faces and into which cooling water is introduced, said hole in said one side wall extending to the side of said cooling-water space so that the proximal end of said electrode projects into said space.

6. A set of electrodes for the spot welding machine according to claim 1, comprising said first and third electrodes, said first electrode having a distal end slanted at a predetermined angle to a plane vertical to the central axis of said first electrode and formed with an engaging groove with a substantially semicircular cross section, and one distal-end side face of said third electrode having a curved surface with a substantially semicircular cross section, whose radius of curvature is smaller than that of said engaging groove of said first electrode, so that said one distal-end side face is fitted in said engaging groove.

7. The electrode set according to claim 6, wherein there is a relation:

$$0.93r1 < r2 < 0.95r1,$$

where r1 and r2 are the respective radii of curvature of said engaging groove of said first electrode and said one distal-end side face of said third electrode.

8. The electrode set according to claim 6, wherein the tilt angle of said engaging groove of said first electrode ranges from 0° to 30°.

9. The electrode set according to claim 6, wherein said engaging groove of said first electrode includes a first groove portion having said predetermined tilt angle and engaging said one distalend side face of said third electrode, and a second groove portion continuous with said first groove portion and having a tilt angle greater than said predetermined tilt angle.

10. The electrode set according to claim 6, wherein the other distal-end side face of said third electrode is slanted along the loading or unloading direction of said workpiece, at a predetermined angle to said workpiece engaging face of said second electrode.

11. An electrode for the spot welding machine according to claim 1, comprising said second electrode, said workpiece engaging face of said second electrode being slanted at a predetermined angle along the loading or unloading direction of said workpiece.

* * * * *

UNITED STATES PATENT AND TRADEMARK OFFICE
CERTIFICATE OF CORRECTION

PATENT NO. : 4,835,356
DATED : May 30, 1989
INVENTOR(S) : Noriyoshi ABE

It is certified that error appears in the above-identified patent and that said Letters Patent is hereby corrected as shown below:

On the title page, the Assignee should be

--Kyoshin Kogyo Co., Ltd., Tokyo, Japan--

Signed and Sealed this

Fifth Day of June, 1990

Attest:

HARRY F. MANBECK, JR.

Attesting Officer   Commissioner of Patents and Trademarks